United States Patent [19]

Bassett et al.

[11] Patent Number: 5,662,015

[45] Date of Patent: Sep. 2, 1997

[54] CUTTING TOOL HOLDER WITH STRAIN GAUGE DISPLACEMENT INDICATOR

[75] Inventors: Roger Bassett; Terence Ian Negus, both of Cornwall; Roger Sidey, Surrey, all of England

[73] Assignee: Rigibore Limited, United Kingdom

[21] Appl. No.: 520,938

[22] Filed: Aug. 31, 1995

[30] Foreign Application Priority Data

Sep. 1, 1994 [GB] United Kingdom ............... 9417556

[51] Int. Cl.$^6$ .................... B23B 29/03; B23Q 17/22
[52] U.S. Cl. .................................. 82/158; 407/74
[58] Field of Search ............. 82/158, 161; 407/10, 407/74; 408/9, 13

[56] References Cited

U.S. PATENT DOCUMENTS

| | | |
|---|---|---|
| 3,400,616 | 9/1968 | Mihic . |
| 3,741,672 | 6/1973 | Hedberg . |
| 3,844,672 | 10/1974 | Fitzsimmons . |
| 3,911,542 | 10/1975 | Friedline et al. ............ 407/74 |
| 4,822,215 | 4/1989 | Alexander ................... 408/9 |
| 5,170,103 | 12/1992 | Rouch et al. ................ 82/158 |
| 5,251,522 | 10/1993 | Chin-Lon .................... 82/158 |
| 5,393,177 | 2/1995 | Cook et al. .................. 408/13 |

Primary Examiner—Daniel W. Howell
Assistant Examiner—Kenneth J. Hansen
Attorney, Agent, or Firm—Andrus, Sceales, Starke & Sawall

[57] ABSTRACT

A cutting tool holder assembly comprises a body having a shaft non-rotatably mounted therein for axial movement to enable adjustment of a cutting tool on a cutting tool holder member carried by the shaft. Strain gauge elements are mounted on a blade which is arranged to be deflected upon relative movement between the shaft and the body. The strain gauge elements produce an output signal proportional to the deflection of the blade.

11 Claims, 3 Drawing Sheets

CUTTING TOOL HOLDER WITH STRAIN GAUGE DISPLACEMENT INDICATOR

FIELD OF THE INVENTION

This invention relates to a cutting tool holder and is more particularly concerned with a cutting tool holder assembly which can enable very accurate adjustment of the cutting tool.

BACKGROUND OF THE INVENTION

It is known in cutting tool holders to effect adjustment of the cutting tool by rotation of an internally screw-threaded wheel having graduations thereon. The wheel is rotatably mounted in a body of the holder and engages an externally screw-threaded shaft upon which the cutter is mounted in use. The shaft is mounted in the body against rotation relative thereto but is axially moveable relative to the body upon rotation of the wheel. The graduations on the wheel provide a visual indication of position of the cutting tool relative to the cutting tool holder body. With such a manual adjustment mechanism, the cutting tool can be set manually to an accuracy of about 10 µm.

It is an object of the present invention to provide an improved cutting tool holder assembly which is compact and which enables the cutting tool to be set to a high degree of accuracy.

SUMMARY OF THE INVENTION

According to the present invention, there is provided a cutting tool holder assembly comprising a body, a shaft mounted in the body for axial movement relative thereto, a cutting tool holder member carried by the shaft externally of the body, means for preventing rotation of the shaft relative to the body, means for moving the shaft axially relative to the body to enable adjustment of a cutting tool carried by the cutting tool holder member in use, and means for indicating the position of the shaft relative to the body, said indicating means comprising at least one strain gauge element mounted on a member which is arranged to be deflected upon relative movement between the shaft and the body, and said indicating means being adapted to produce an output signal proportional to the deflection of said member.

In one convenient embodiment said member upon which said at least one strain gauge element is mounted is a cantilever beam.

The cantilever beam may have a constant thickness throughout its length, or it may have a cut-away section to lower its bending resistance in the region of said at least one strain gauge element. However, it is preferred for the cantilever beam to be of blade-like form with the surfaces of the blade facing the direction of relative movement between the shaft and the body. It is particularly preferred for the edges of the blade-like cantilever beam to taper inwardly towards an end which abuts against an abutment surface on one of the relatively moveable parts, preferably an abutment surface which moves with the shaft. With such a cantilever beam arrangement, a near uniform strain for a given end deflection is possible, thus minimising sensitivity of strain gauge positioning on the beam, and also minimising the overall cantilever length for a given beam thickness, maximum material strain and end deflection.

Most preferably, said end which engages the abutment surface is defined by a spherical or part-spherical member. The use of such a spherical or part-spherical member minimises the effects of unwanted movements/forces on the cantilever beam due to preloaded contact with the moving part and unwanted movements/forces due to movement itself.

In another convenient embodiment, said member upon which said at least one strain gauge element is mounted is a flexible diaphragm which is disposed so as to be deflected upon relative movement between the shaft and the body.

Said at least one strain gauge element may be of any suitable type and is conveniently of the resistive type, i.e of the type where the electrical resistance changes as the strain applied thereto changes. It is particularly preferred for there to be a plurality of strain gauge elements, preferably two or four.

In a particularly convenient embodiment, the strain gauge elements are connected in a bridge circuit mounted on the assembly and having output connections thereto to enable a reader unit equipped with a visual display to be electrically connected thereto when a measurement is to be taken.

It is particularly preferred for the strain gauge element(s) and said member to be mounted on the body or a part fixed thereto so that part of said member engages with an abutment surface which is fixed relative to the shaft for movement therewith. Preferably, means are provided for resiliently urging said end of the cantilever beam into engagement with said abutment surface.

BRIEF DESCRIPTION OF THE DRAWINGS

Embodiments of the present invention will now be described, by way of example, with reference to the accompanying drawings, in which.

DETAILED DESCRIPTION OF THE INVENTION

Figure 1:
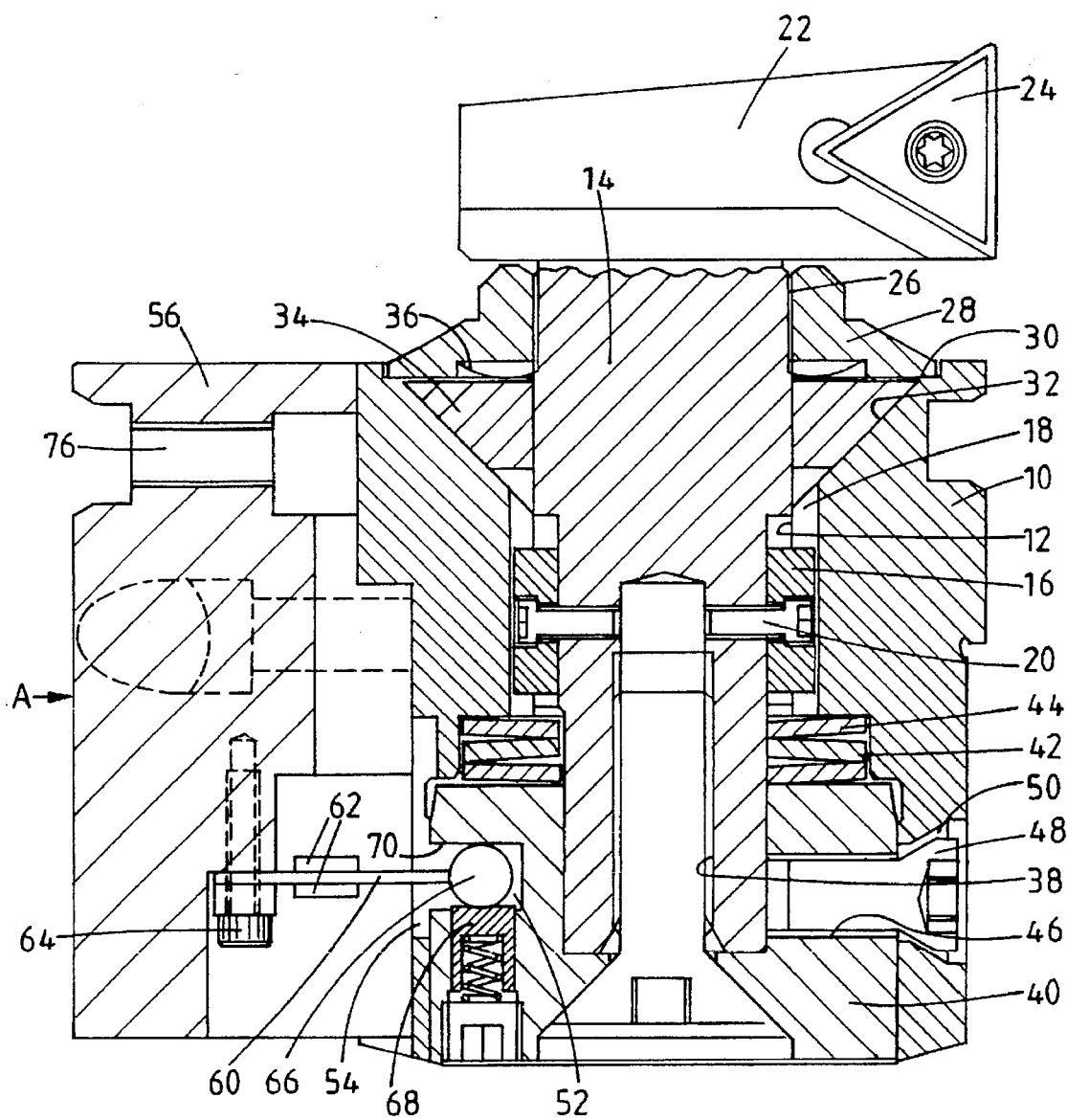
FIG. 1 is an axial section through a cutting tool holder assembly according to the present invention.
Figure 2:
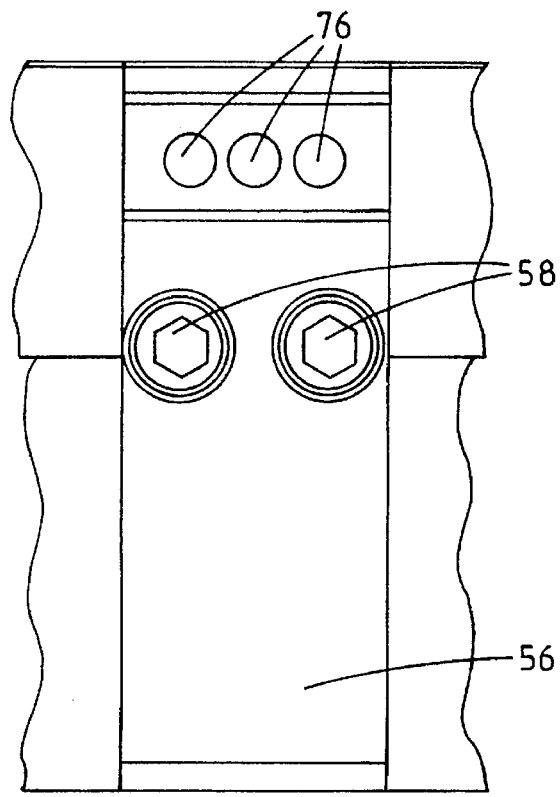
FIG. 2 is a scrap detail taken in the direction of arrow A of FIG. 1.

Referring now to FIGS. 1 and 2 of the drawings, the cutting tool holder assembly comprises a body 10 having a bore 12 therethrough. A shaft 14 is mounted in the bore 12 and is provided with oppositely directed keys 16 engaging in respective keyways 18 formed in the wall of the bore 12. The keyways 16 are secured to the shaft 14 by means of respective fixing screws 20. Thus, the shaft 14 is axially slidable relative to the body 10 but is restrained against rotation relative thereto. At one end, the shaft 14 projects externally of the body 10 and carries a laterally extending cutting tool holder member 22 rigidly supporting a replaceable, multi-tip cutting tool 24. Adjacent the holder member 22, the shaft 14 is provided with a screw-threaded region 26 engaged by an internally screw-threaded adjustment wheel 28 which abuts an annular abutment surface 30 recessed into the adjacent end of the body 10 and disposed around a deeper, frusto-conical recess 32 in said end of the body 10. A frusto-conical thrust ring 34 is engaged in the recess 32 and surrounds the shaft 14. A thrust washer 36 acts between the wheel 28 and the thrust ring 34 to restrain the wheel 28 against unwanted rotation. At the opposite end of the shaft 14 to the cutting tool holder member 22, the shaft 14 is provided with an internally splined bore 38 to enable it to be connected to a correspondingly splined rotary boring bar (not shown) to enable the whole of the cutting tool holder assembly to be rotated in use.

At the same end of the shaft 14 as the bore 38, there is provided a thrust member 40 which is fixedly secured to the outside of the shaft 14. Thrust washers 42 disposed between an inner end of the thrust member 40 and an internal abutment surface 44 serve to urge the thrust member 40 and thereby the shaft 14 in a direction such as to urge the wheel 28 into abutment with the annular abutment surface 30 and the frusto-conical thrust ring 34 into engagement with the frusto-conical surface 32, respectively.

The thrust member 40 is provided with an internally screw-threaded, radially extending bore 46 which receives an externally screw-threaded locating stud 48 having an enlarged head mounted in a recess 50 in the body 10. There is sufficient axial clearance between the head of the stud 48 and the wall of the recess 50 to enable the required axial movement of the shaft 14 relative to the body 10 to take place. This locating stud 48 ensures that a recess 52 on the opposite side of the thrust member 40 is aligned with an axially extending slot 54 which extends from the outer periphery of the body 10 to the bore 12.

A housing 56 is secured by bolts 58 to the body 10 so as to extend over that region of the latter in which the slot 54 is provided. The housing 56 carries a blade-like cantilever beam 60 having a pair of resistance-type strain gauge elements 62 bonded to opposite faces of the beam 60. The beam 60 is formed of a relatively thick metal section and is tapered inwardly from a location at which it is secured within the housing 56 by means of fixing screws 64 to a tip terminating in a ball 66 (see FIG. 3). The beam 60 extends radially inwardly relative to the axis of rotation of the tool holder assembly so that, it passes into the slot 54 with the ball 66 engaging in the recess 52 in the thrust member 40. A spring-loaded plunger 68 engages resiliently against the ball 66 and serves to urge it into engagement with a wall 70 of the slot 52, the wall 70 thereby providing an abutment surface.

The strain gauge elements 62 are connected in a half bridge circuit (see FIG. 6), by wires 72 to three output terminals 74a to 74c provided in a set of three bores 76 (FIGS. 1 and 2) in the housing 56.

It is therefore to be appreciated that an output signal can be provided at the terminals 74a to 74c which is proportional to the strain sensed by the strain gauge elements 62, such strain being determined by the amount of flexure of the cantilever beam 60. It will be appreciated that rotation of the adjustment wheel 28 to adjust the position of the cutting tool 24 affects the degree of flexure of the cantilever beam 60 and so changes the resistance of the strain gauge elements 62.

In use, a reader unit 78 can be plugged into the terminals 74. The reader unit 78 includes terminals 80a to 80c removably connectible to respective ones of the terminals 74a to 74c. The outer terminals 80a and 80c are connected to opposite ends of a half bridge circuit 82 in the reader unit 78 and provide the input to the resultant bridge. The centre terminal 80b and the centre of the half bridge circuit 82 provide the output from the bridge and are connected to a differential amplifier 84 whose output is passed to an analogue-to-digital converter 86 having a multi-channel input. Bridge current is sensed by the use of a low value resistor 88 connected between the end of half bridge circuit 82 to which terminal 80c is connected and ground. The resistor 88 is provided to check for valid connection/ condition of the contacts/lead wires. The voltage across the resistor 88 is fed to one of the inputs of the converter 86 and subjected to a test to determine the contact resistance present. The converter 86 drives a microprocessor controlled LCD or LED display 90 which provides a digital read-out of the setting of the wheel 28. The reader unit 78 is unplugged when the wheel 28 has been set so as to enable a cutting operation using the cutting tool 24 to be effected. With this arrangement, it is found that the cutting tool 24 can be set to an accuracy of about 1 micrometer.

The use of a cantilever beam upon which one or more strain gauge elements are mounted enables a very compact construction to be achieved, particularly when the cantilever beam is tapered as described and is provided with a ball at the end to avoid imposing unwanted torsional or compression forces on the cantilever beam which might otherwise lead to an inaccurate output.

In a modification (not shown) a group of four strain gauges is provided instead of the two strain gauges 62 described above, to enable a full bridge circuit to be used. The use of a group of two or four strain gauges is preferred because a single strain gauge is not very stable and difficulties can be encountered with temperature drift and lead-wire and contact resistance giving false readings.

Figure 3:
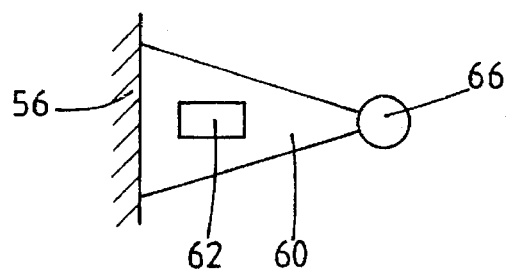
FIG. 3 is a schematic plan view of a detail showing a cantilever beam and strain gauge arrangement forming part of the assembly of FIG. 1, FIGS. 4 and 5 are schematic side and plan view respectively showing a different form of strain gauge arrangement in which a diaphragm is used instead of a cantilever beam.
Figure 4:
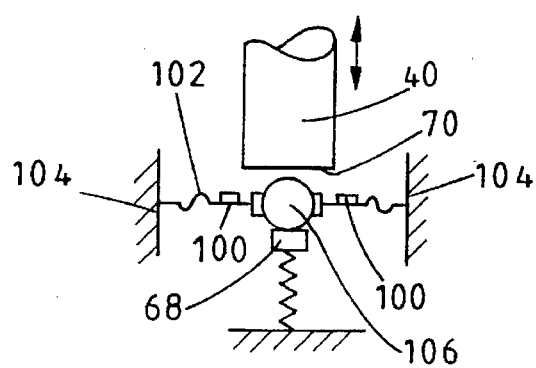
Figure 5:
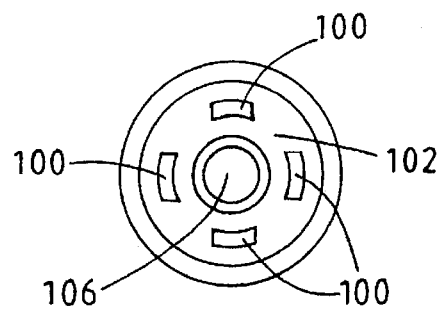

In FIGS. 4 and 5, parts which are similar to those of the embodiment of FIGS. 1 to 3 are accorded the same reference numerals. In this embodiment, four strain gauge elements 100 are shown mounted in equi-angularly spaced relationship on one face of a flexible diaphragm 102, although a smaller number of strain gauge elements 100 is possible. The diaphragm 102 is secured around its periphery on a body part 104 which is fixed relative to the body 10. A ball 106 is mounted on the diaphragm 102 at the centre thereof, and is arranged to be urged by spring-loaded plunger 68 in the direction of abutment surface 70 on thrust member 40. An advantage of this type of construction is that it can be configured in line with the moving components and therefore does not require excessive radial space which is very restricted with this type of cutting tool assembly. The strain produced upon relative movement between the body 10 and the shaft 14 is radialiand tangential with respect to the diaphragm 102.

Figure 6:
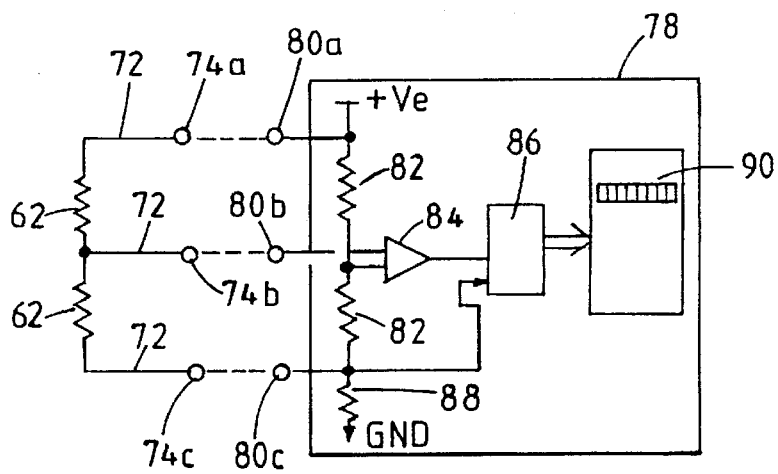
FIG. 6 is a circuit diagram showing the strain gauge arrangement in the embodiment of FIGS. 1 to 3 and in a reader unit.
Figure 7:
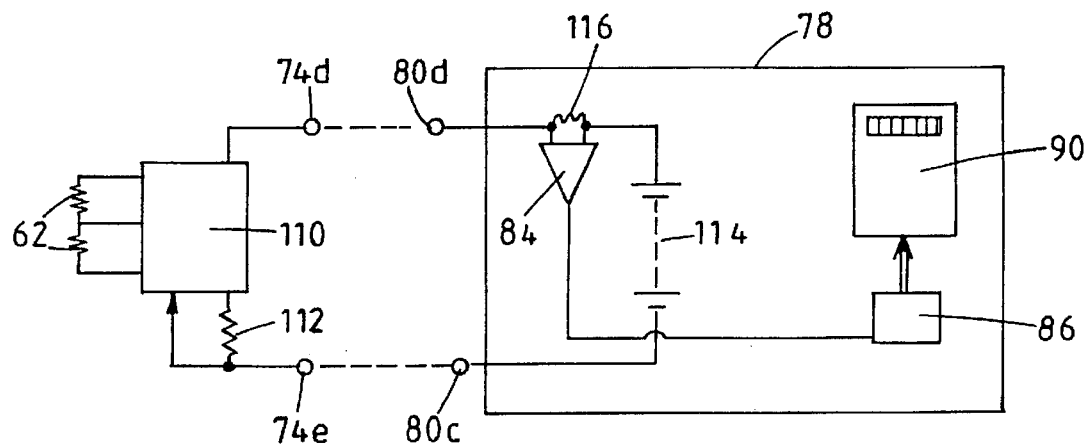
FIG. 7 is a circuit diagram of an alternative embodiment.

In FIG. 7, parts which are similar to those of FIG. 6 are accorded the same reference numerals. The circuit of FIG. 7 is a current loop system in which the strain gauge elements 62 are connected to a signal conditioning unit 110 located within the housing 56. The unit 110 is connected directly to terminal 74 and via a loop current sensing resistor 112 to terminal 74e. The resistor 112 provides a feedback to unit 110 to allow the latter automatically to make adjustment such that the loop current is proportional to the strain gauge sensor output and thus to the deflection of the cantilever arm 60. Within reader unit 78, there is provided a power supply 114 for the current loop which includes the signal conditioning unit 110, the current sensing resistor 112, and a resistor 116 located within the reader unit 78. The voltage across the resistor 116 provides the input to the amplifier 84.

The signal conditioning unit 110 acts to modulate the current flowing through the loop in proportion to movement as sensed by the strain gauge elements 62. The circuit within the unit 110 derives power from the loop current and serves to modulate this current so that it is proportional to the deflection of the cantilever arm 60. The circuit within the unit 110 reserves a minimum current for internal operation (the offset value) and operates by shunting the terminals 74d and 74e with an electronically controllable load so as to add to this offset current an amount of current proportional to the measured output signal from the elements 62. This is done by comparing the output of the assembly of strain gauge elements 62 with the current in the loop (as determined by the voltage across the resistor 112), and adjusting the electronically controlled shunt across the terminals 74d and 74e until these two quantities are equal. In this way, the current in the loop always exceeds the offset value in a manner proportional to the strain gauge output signal. The fact that the offset value is always present as the minimum value is useful in detecting fault conditions. If this minumum offset current is not found to be present, a warning is flagged to the operator of the system to investigate the cause. Thus, the system functions with only two connections and a two wire pair link between the circuitry within the housing 56 and the circuitry within the reader unit 78. This type of connection is very tolerant of cable resistance and changes in connector contact resistance.

The voltage signal passed into the amplifier 84 from across the resistor 116 is processed as described above by the analogue-to-digital converter 86 and the microprocessor and display 90 to provide a digital read-out of the setting of the wheel 28. This arrangement has a low sensitivity to the contact quality of the connection between connectors 74 and 80 (eg it permits the use of a calliper attachment) and also involves a two-wire connection which is simpler to implement than a three wire system as in FIG. 6.

We claim:

1. A cutting tool holder assembly comprising a body, a shaft mounted in said body for axial movement relative thereto, a cutting tool holder member carried by said shaft externally of said body, means for preventing rotation of said shaft relative to said body, moving means for moving said shaft axially relative to said body to enable adjustment of a cutting tool carried by said cutting tool holder member in use, and indicating means for indicating the position of the shaft relative to the body, wherein said indicating means comprises at least one strain gauge element, mounted on a deflectable member which is arranged to be deflected upon relative movement between said shaft and said body, and wherein said indicating means is adapted to produce an output signal proportional to the deflection of said deflectable member.

2. The cutting tool holder assembly according to claim 1, wherein said deflectable member upon which said at least one strain gauge element is mounted as a cantilever beam.

3. The cutting tool holder assembly according to claim 2, wherein said cantilever beam is of blade form with the surfaces of the blade facing the direction of relative movement between said shaft and said body.

4. The cutting tool holder assembly according to claim 3, wherein the edges of said cantilever beam taper inwardly towards an end which abuts against an abutment surface on one of said shaft and said body.

5. The cutting tool holder assembly according to claim 4, wherein said abutment surface moves with said shaft.

6. The cutting tool holder assembly according to claim 4, wherein said end which engages said abutment surface is defined by a spherical member.

7. The cutting tool holder assembly according to claim 4, wherein means are provided for resiliently urging said end of said cantilever beam into engagement with said abutment surface.

8. The cutting tool holder assembly according to claim 1, wherein said deflectable member upon which said at least one strain gauge element is mounted is a flexible diaphragm which is disposed so as to be deflected upon relative movement between said shaft and said body.

9. The cutting tool holder assembly according to claim 1, comprising a plurality of said strain gauge elements connected in a bridge circuit mounted on the assembly and having output connections thereto to enable a reader unit equipped with a visual display to be electrically connected thereto when a measurement is to be taken.

10. The cutting tool holder assembly according to claim 1, wherein said at least one strain gauge element and said deflectable member are operatively mounted on said body so that part of said deflectable member engages with an abutment surface which is fixed relative to said shaft for movement therewith.

11. A cutting tool holder assembly comprising a body, a shaft mounted in said body for axial movement relative thereto, a cutting tool holder member carried by said shaft externally of said body, a rotation prevention arrangement disposed between said shaft and said body, an adjustor to provide movement of said shaft axially relative to said body for adjustment of a cutting tool carried by said cutting tool holder member in use, and an indicator for indicating the position of the shaft relative to the body, wherein said indicator comprises at least one strain gauge element mounted on a deflectable member which is arranged to be deflected upon relative movement between said shaft and said body, and wherein said indicator is adapted to produce an output signal proportional to the deflection of said deflectable member.

* * * * *